UNITED STATES PATENT OFFICE.

DONALD NICOLL, OF LONDON, ENGLAND.

IMPROVEMENT IN RENDERING FABRICS UNINFLAMMABLE.

Specification forming part of Letters Patent No. 142,267, dated August 26, 1873; application filed January 28, 1873.

*To all whom it may concern:*

Be it known that I, DONALD NICOLL, of Paternoster Row, in the city of London, manufacturer, have invented certain Improved Preparations applicable to Woven and other Fabrics, for the purpose of rendering the same Uninflammable, of which the following is a specification:

The object of this invention is to provide a facile means of rendering vegetable tissues uninflammable. The invention applies to cotton and linen fabrics, and also to paper, but the latter material will require a somewhat different treatment from that of the cotton and linen fabrics.

To render the textile fabrics non-inflammable according to my invention, it will be convenient to give them this property at the time of applying starch or a stiffening material thereto. In furtherance of this end, I make a new preparation of starch, which may be used after the manner of ordinary laundresses' starch. Thus, I take, for example, say, sago flour, five pounds, and rice flour, or its equivalent, four pounds. These I mix together in a mill, adding thereto ultramarine sufficient to bring up the color. To this flour I add, say, eleven pounds of the compound, which I will now describe.

I first prepare a mixture, in equal proportions, of powdered borax and dextrine, moistened with water. These substances I place in a vessel, maintained at a heat somewhat exceeding 200° Fahrenheit, to insure their thorough amalgamation. To this mixture I add dry sulphate of ammonia in the proportion, say, of nine pounds of this substance to two pounds of the borax and dextrine, and mix the ingredients intimately, whereby a compound is produced suitable for admixture with the starch. When this is effected I reduce the whole to fine powder by grinding. A dry compound is thus prepared, which may be employed like ordinary starch for stiffening woven fabrics.

Instead of combining the sulphate of ammonia with the dextrine and borax mixture, as above described, it may be added to the starch, together with the other materials, without such preparatory combination, and a like result will be obtained by grinding the several substances together in the mill.

In treating paper according to my invention, to render the same uninflammable, instead of providing a dry preparation, I manufacture a solution suitable for application to the paper in following manner: In one gallon of water I dissolve, say, four ounces of alum, and to this solution I add a mixture of dry sulphate of ammonia and dextrine. Of the sulphate of ammonia I take, say, eight ounces, and of the dextrine a half an ounce for each gallon of the solution to be made. These two substances I place in a closed vessel, and rotate the same in a bath of steam or water somewhat exceeding a temperature of 200° Fahrenheit. When these substances have been well mixed, I add the alum-water, close up the vessel, and continue its rotation until all the ingredients are dissolved.

The solution thus obtained, if not required for immediate use, is to be kept in closed vessels.

The paper to be rendered uninflammable is to be steeped in or run through a bath of the above-described solution, and it may then be dried in the manner now commonly practiced by paper manufacturers.

I would remark that, although I have given definite proportions of the materials which I employ in the manufacture of the dry preparation and of the solution, yet I do not limit myself to those proportions, as they may doubtless be varied without materially affecting the desired result.

The effect of the dextrine in these compounds is to fix the sulphate of ammonia in the fabric—a result that is very imperfectly accomplished by starch.

Having now set forth the nature of my invention, and explained the manner of carrying the same into effect, I wish it to be understood that I do not claim the use of any of the above-named materials separately; but

What I claim is—

The admixture with sulphate of ammonia preparations, for rendering woven and other fabrics uninflammable, of dextrine, as above described, whereby the sulphate of ammonia is fixed in the fabric.

DONALD NICOLL.

Witnesses:
   H. K. WHITE,
      66 *Chancery Lane;*
   G. W. WESTLEY,
      24 *Royal Exchange, London.*